United States Patent
Shah et al.

(10) Patent No.: US 6,205,545 B1
(45) Date of Patent: *Mar. 20, 2001

(54) METHOD AND APPARATUS FOR USING STATIC BRANCH PREDICTIONS HINTS WITH DYNAMICALLY TRANSLATED CODE TRACES TO IMPROVE PERFORMANCE

(75) Inventors: Lacky V. Shah, Fremont; James S. Mattson, Jr., Campbell; William B. Buzbee, Half Moon Bay, all of CA (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/070,585

(22) Filed: Apr. 30, 1998

(51) Int. Cl.[7] .................................................. G06F 9/32
(52) U.S. Cl. ............................................................ 712/237
(58) Field of Search ..................................... 713/234, 237

(56) References Cited

U.S. PATENT DOCUMENTS 4,833,599 * 5/1989 Colwell et al. ....................... 712/236
5,949,995 * 9/1999 Freeman ............................... 712/239

* cited by examiner

Primary Examiner—David Y. Eng
(74) Attorney, Agent, or Firm—David A. Plettner

(57) ABSTRACT

A run-time optimization strategy uses a trace picker to identify traces of program code in a native code pool, and a translator to translate the traces into a code cache where the traces are executed natively. Static branch prediction hints are encoded in branch instruction in the translated traces. A program module implementing the present invention is initialized with an empty code cache and a pool of instruction in a native code pool. The trace picker analyzes the instructions in the native code pool and identifies traces of instructions that tend to be executed as a group. When a trace is identified, basic blocks lying along the trace path are translated into a code cache, with static branch predictions encoded into the branch instructions of the basic blocks based on branching behavior observed when the trace is identified. Control then passes to the basic blocks in the code cache, and the basic blocks in the code cache are executed natively using the static branch prediction hints encoded into the branch instructions.

13 Claims, 4 Drawing Sheets

METHOD AND APPARATUS FOR USING STATIC BRANCH PREDICTIONS HINTS WITH DYNAMICALLY TRANSLATED CODE TRACES TO IMPROVE PERFORMANCE

CROSS REFERENCE TO RELATED APPLICATION

The present application contains subject matter related to a co-pending U.S. Patent Application entitled "A Method and Apparatus for Varying Branch Prediction Strategy Within a Program" by James S. Mattson, Jr. et. al. This application was filed on Apr. 30, 1998, which is the same date as the filing date of the present application, names the same inventors as the present ap plication, is assigned to the same assignee as the present application, has been assigned U.S. application Ser. No. 09/070,442, and is hereby incorporated by reference.

FIELD OF THE INVENTION

The present invention relates to the execution of computer instructions in a computer system. More specifically, the present invention relates to a method and apparatus wherein a trace picker identifies traces of program code in a native code pool, and translates the traces for native execution, with static branch prediction hints encoded in branch instruction in the translated traces.

DESCRIPTION OF THE RELATED ART

Early computer systems serially executed one computer instruction at a time, and did not start executing an instruction until the previous instruction had completed. As the art of computer design progressed, computer designers began to incorporate various types of parallelism into computer systems.

One type of parallelism is pipelining. Pipelining breaks down the execution of a computer instruction into various steps, and processes multiple instructions simultaneously by overlapping these steps. Another type of parallelism is superscaling. Superscaling uses multiple execution units to process separate instructions simultaneously.

Branch instructions can limit the advantages provided by parallel design techniques. Often, when a branch instruction is executed, the condition that the branch instruction must test has not yet been determined. Early computer systems simply halted execution of the branch instruction (and subsequent instructions) until the condition was determined. However, this negatively affects performance. For example, in a pipelined computer often the pipeline must be emptied before the condition can be determined, which limits the benefits achieved by pipelining.

To address this problem, computer designers started to include mechanisms that predict branch behavior. When a branch instruction is encountered, the branch behavior of the branch instruction is predicted. Later, when the condition can be evaluated, the prediction is also evaluated to determine if it is correct. If the prediction is correct, execution continues and the advantages achieved by parallel execution are preserved. If the prediction is incorrect, instructions that were provisionally executed must be purged from the pipeline and the instructions from the correct branch must be executed. However, the penalty for an incorrect branch is typically not any worse than halting execution and waiting for the condition to be determined.

The performance gains achieved by branch prediction are, of course, strongly related to the accuracy of the prediction. Accordingly, many techniques have been developed to provide accurate branch predictions. One of the earliest techniques was to simply predict that a branch is always taken. Statistically, most branches are taken, so this technique proved somewhat successful. A similar technique predicts that backward branches are always taken, and forward branches are never taken.

Another technique uses an address table of addresses to which branch instructions recently branched. Typically, the table consists of an associative memory having 4 to 8 entries. If an address in a branch instruction also appeared in the table, then that address is used as the predicted execution path.

A more sophisticated approach was disclosed by James E. Smith in U.S. Pat. No. 4,370,711. Smith disclosed a random access memory (RAM) having, for example, 16 entries, each containing a two bit count capable of assuming the values +1, 0, −1, and −2. A hash mechanism transforms the branch instruction address into a four bit address that accesses the RAM. If the value stored in an entry associated with a branch instruction is +1 or 0, then the branch is predicted as taken. Otherwise, the prediction is that the branch is not taken. After the branch instruction is executed, if it is taken, the count memory entry is incremented up to a limit of +1. If it is not taken, the count memory address is decremented down to a limit of −2. The prediction scheme disclosed by Smith incorporates branch history in the formulation of the branch prediction. For example, if the branch has been taken several times, it must be not taken twice in a row to change the prediction. Many computer systems use some variation of this scheme, with a table that stores a prediction and a hash function that associates a branch instruction with a prediction.

Another approach is disclosed by Hanan Potash in U.S. Pat. No. 4,435,756. Potash discloses encoding a branch prediction in each branch instruction based on whether it is probable that the branch condition will be evaluated as being true or false. In another embodiment, Potash discloses encoding branch history and a branch prediction in a branch instruction. In this embodiment, if the prediction proves to be incorrect two times in a row, the prediction is changed, which requires encoding a new prediction into the branch instruction and writing the branch instruction back to memory. Note that the branch instruction must also be written back to memory whenever branch history changes, even if the prediction does not change. This creates a large amount of write data, which lowers I/O throughput. For example, a branch instruction that alternates between two branch paths must be written back to memory every time it is executed.

Certain computer systems manufactured by Hewlett-Packard Company have used two types of branch prediction; a hardware-based branch prediction scheme that uses a prediction table to store dynamically generated branch predictions close to the CPU, and a software-based branch prediction scheme that encodes static branch predictions into each branch instruction when a computer program is compiled. With software-based branch prediction, the prediction is encoded in the branch instruction based on the order of the operands in the compare function. Specifically, if the first register number is lower than the second register number, backward branches will be predicted as taken and forward branches will be predicted as not taken. On the other hand, if the first register number is equal to or higher than the second register number, backward branches will be predicted as not taken and forward branches will be predicted as taken. For example, consider the following compare and branch (COMB) instructions, and assume that both instructions branch forward:

COMB,<R5, R3, Address,
and
COMB,>=R3, R5, Address.

A branch prediction of "taken" will be encoded in the first instruction and a branch prediction of "not taken" will be encoded in the second instruction, even though the instructions are logically identical.

To generate effective predictions, it is necessary to perform a "profile-based optimization" (PBO) run, wherein branching behavior is observed while an application is executing in a typical computing environment. After the PBO run is complete, the user's application is recompiled to incorporate updated branch predictions based on branching behavior observed during the PBO run.

An advantage provided by prior art software-based branch prediction techniques it that the prediction can be based on behavior observed over an extended period, not just the last branch or two. Also, software-based branch prediction requires less complex, less expensive hardware. It is much simpler to design hardware that only implements a branch prediction, compared to hardware that must also judge the accuracy of predictions and update predictions accordingly.

A disadvantage of software-based branch prediction techniques is that the prediction is static and does not adapt to changes in program data or the computing environment. Once the prediction is compiled into the branch instruction, it is not changed.

An advantage provided by hardware-based branch prediction techniques is that the prediction mechanism is completely transparent to the user of the computer system. In addition, predictions adapt dynamically to changes in the computing environments that may affect branching (such as changes in information stored in databases). Also, predictions tend to be very accurate when the prediction table is large or a prediction can be associated with each instruction, as disclosed by Potash.

One disadvantage of hardware-based branch prediction is that it is expensive to implement. To increase efficiency and reduce the number of logic gates, prediction tables typically store a limited number of branch instructions and often store none or only a portion of the address of a branch instruction. This can cause the prediction scheme to be overwhelmed by aliasing, thereby causing a prediction to be generated that is not based on the actual branch instruction being executed. Aliasing can be a significant problem for programs having many frequently executed branch instructions, such as database programs.

Anne M. Holler and Lacky V. Shah disclosed a method of minimizing hardware-based branch prediction aliasing in U.S. Pat. No. 5,721,893, which is entitled "Exploiting Untagged Branch Prediction Cache by Relocating Branches", is assigned to the same assignee as the present application, and is hereby incorporated by reference. In the method disclosed by Holler et al., branch instructions are divided into buckets that correspond to entries in a prediction table, thereby identifying branch instruction that will use the same entry of the branch prediction table. The method then determines whether the predictions will tend to be the same. To the extent that predictions will tend to be the same, multiple branch instructions using a common entry in the branch prediction table will not degrade performance because even if an entry is overwritten, the prediction will tend to remain the same. However, if the predictions conflict, performance will suffer because the branch predictions will overwrite each other, and thereby increase the ratio of incorrect predictions. Holler et al. teach that branch instruction positions can be adjusted to cause branch instructions to be moved into buckets in which all branch instructions likely have the same prediction.

Douglas V. Larson disclosed a method of dynamically adjusting static predictions in U.S. Pat. No. 5,838,962, which is entitled "Interrupt Driven Dynamic Adjustment of Branch Predictions", is assigned to the same assignee as the present application, and is hereby incorporated by reference. As taught in this patent, a branch prediction associated with a branch instruction is adjusted by periodically interrupting the central processing unit of a computer and executing a prediction adjustment routine that observes a pending branch instruction. If a branch instruction is not pending, the prediction adjustment routine ends and execution of the interrupted instruction stream resumes. If a branch instruction is pending, the branch instruction is evaluated and compared with a branch prediction associated with the branch instruction. If the prediction is correct, execution of the interrupted instruction stream is resumed. If the prediction is not correct, then the prediction is evaluated to determine whether it should be changed. In one embodiment disclosed in this patent, prior branch history of the branch instruction is also used to determine whether the branch prediction should be changed.

SUMMARY OF THE INVENTION

The present invention is a method and apparatus wherein a trace picker identifies traces of program code in a native code pool, and a translator translates the traces for native execution, with static branch prediction hints encoded in branch instructions in the translated traces. The present invention operates as part of a run-time optimization strategy.

A program module implementing the present invention is initialized with an empty code cache and a pool of instructions in a native code pool. A trace picker analyzes the instructions in the native code pool and identifies traces of instructions that tend to be executed as a group. The trace picker may use trace picking techniques known in the art, such as emulation, interrupting and sampling, or inserting instrumentation code into instructions in the native code pool. When a trace is identified, basic blocks lying along the trace path are translated into a code cache, with static branch predictions encoded into the branch instructions of the basic blocks based on branching behavior observed when the trace is identified. Control then passes to the basic blocks in the code cache, and the basic blocks in the code cache are executed natively using the static branch prediction hints encoded into the branch instructions.

At some point a branch instruction in the code cache will branch to a target basic block that is not part of the trace of which the branch instruction is a member. This branch instruction is adjusted to branch to a trampoline block. The trampoline block determines whether target basic block is in the code cache. If it is, the trampoline block passes control to the target trace. If it is not, the trampoline block passes control back to the trace picker.

One advantage of the present invention is that the blocks that lie along a hot path need not come from the same program. For example, if two separate programs are communicating via subroutine calls, and a hot path develops that includes basic blocks from each program, the present invention can store the basic blocks from each program in the code cache in a single trace. Accordingly, the present invention identifies and exploits opportunities for optimization that would be impossible to exploit at compile time.

DETAILED DESCRIPTION OF THE PREFERRED EMBODIMENTS

The present invention is a method and apparatus for optimizing branch prediction accuracy by selecting traces from a pool of native program code instructions and translating selected traces of the native program code instructions to a dynamic code cache. After the traces are placed in the dynamic code cache, the traces are executed natively using static branch prediction hints encoded in branch instructions that have been translated. The static prediction hints are based on branching behavior collected as part of the trace selection process. A computer program, subroutine, or other process implementing the present invention may be executed during run time as part of a run-time optimization strategy. Before discussing the present invention in greater detail, it is helpful to consider a typical computer program and certain architectural features provided by computer systems manufactured by the Hewlett-Packard Company.

Figure 1:
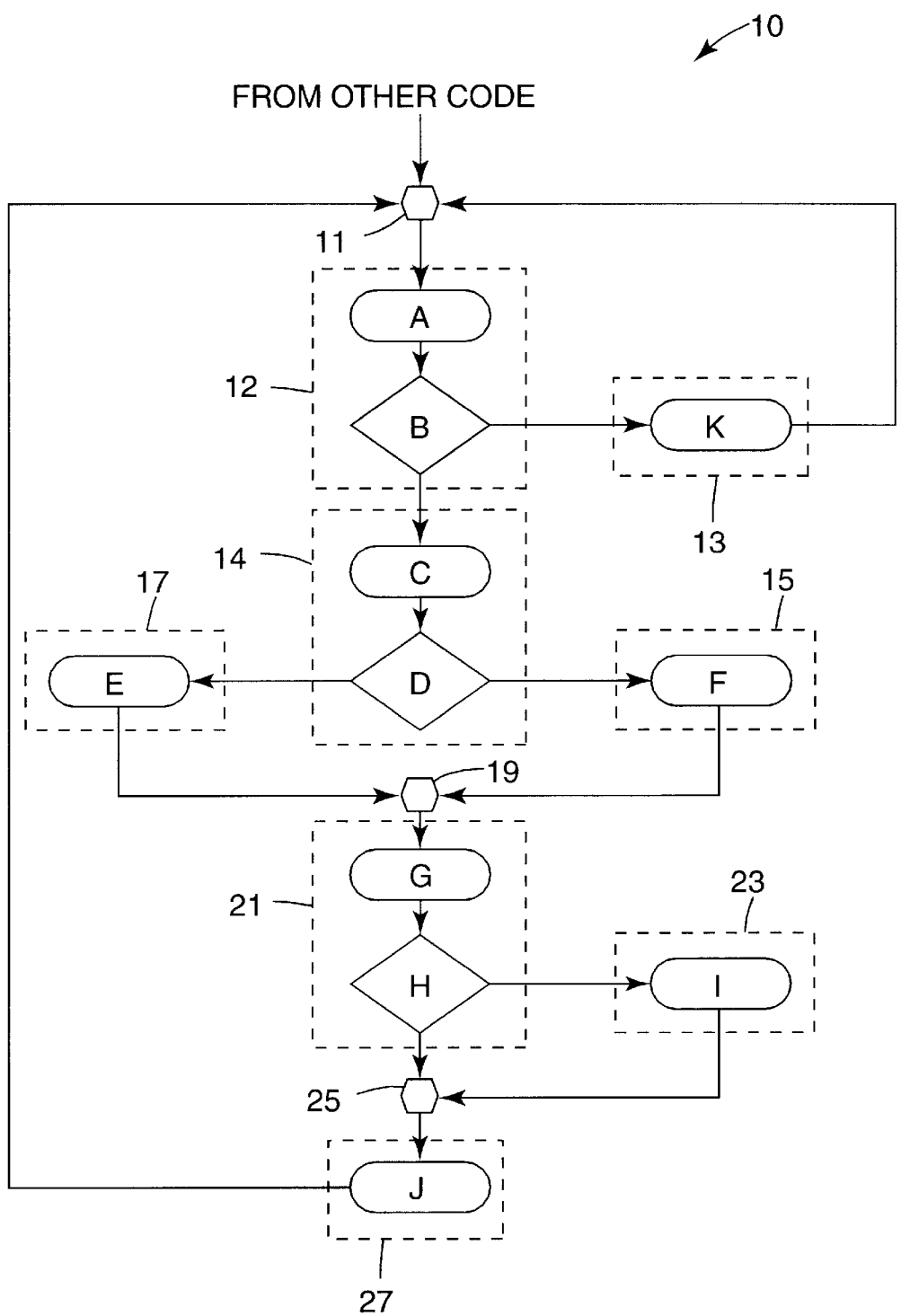
FIG. 1 illustrates a trace from prior art program code having a series of basic code blocks.

FIG. 1 illustrates a group of instructions 10 from a prior art computer program. Instructions 10 are reached from other code via node 11, which represents an address, and need not come from the same program of module. Instructions 10 includes program segments A, B, C, D, E, F, G, H, I, J, and K. Basic block 12 comprises segments A and B, basic block 13, comprises segment K, basic block 14 comprises segments C and D, basic block 15 comprises segment F, basic block 17 comprises segment E, basic block 21 comprises segments G and H, basic block 23 comprises segment I, and basic block 27 comprises segment J. For the purpose of illustrating the present invention, a basic code block is a set of instructions bounded by branch instructions. The present invention will be illustrated below by describing how instructions 10 are processed.

Many pipelined processors execute one or more instructions immediately after a branch instructions before changing the flow of execution if the branch is taken. As is known in the art, in such a pipelined processor the instruction slot immediately after a branch instruction is known as a "delay slot". For the purposes of describing the present invention, any instructions in delay slots that exist in the shadow of a branch instruction are members of the basic block that includes the branch instruction.

Figure 2:
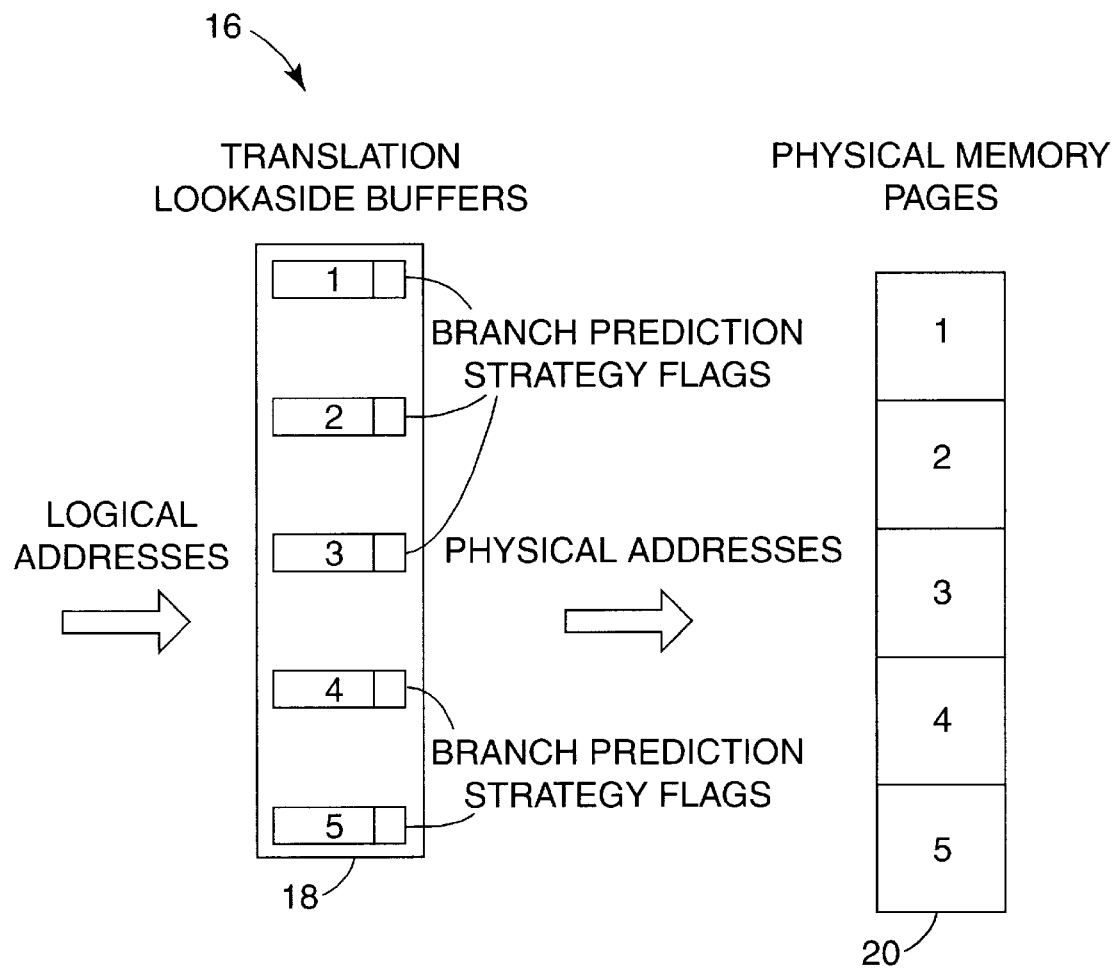
FIG. 2 is a diagram showing a portion of a prior art memory system and illustrates how branch prediction strategy may be adjusted in certain computers manufactured by the Hewlett-Packard Company.

FIG. 2 is a diagram showing a portion of a prior art memory system 16. FIG. 2 illustrates how branch prediction strategy may be adjusted in certain computers manufactured by the Hewlett-Packard Company. In FIG. 2, translation lookaside buffers (TLBs) 18 are part of an apparatus that converts logical (or alternatively, virtual) addresses used in a computer program to physical addresses that are used to access physical memory pages 20. Each TLB includes a branch prediction strategy flag that determines whether branch instructions within the physical memory page associated with the TLB should be predicted using a dynamic or a static prediction strategy. Dynamic and static predictions strategies are described above in the section entitled "Description of the Related Art". The remainder of the functionality provided by TLBs 18 is not necessary to understand the present invention. The concept important to understanding the present invention is that a flag associated with each physical memory page determines the branch prediction strategy for branch instructions within that page.

Figure 3:
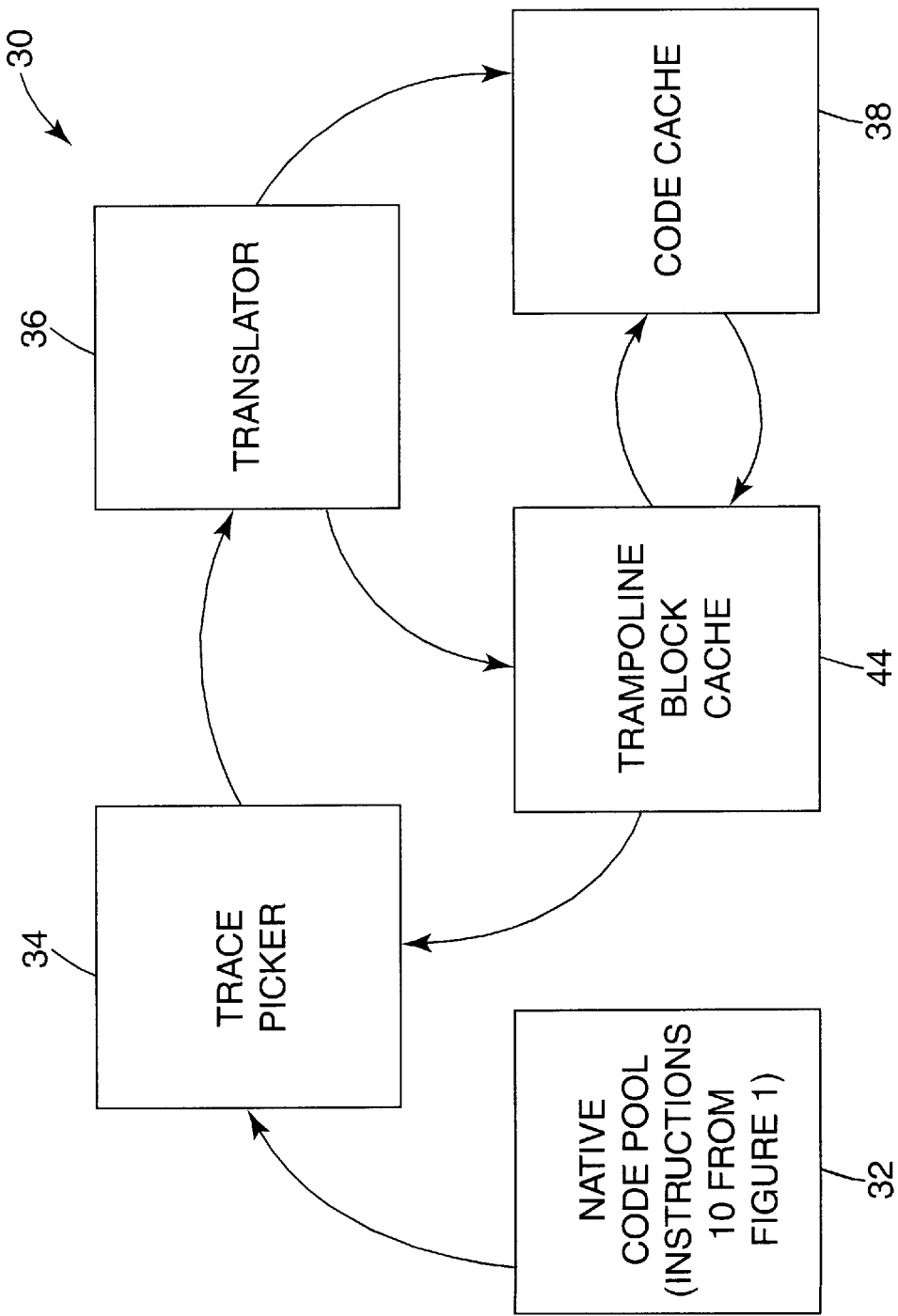
FIG. 3 shows a computer system executing code that implements a trace picker, a translator, a native code pool, a trampoline block cache, and a code cache, in accordance with the present invention.

FIG. 3 shows a computer system 30 provided with computer code implementing the present invention. Execution begins with trace picker 34. Trace picker 34 manages the execution of instructions in native code pool 32. Trace picker 34 may be implemented using trace picking techniques known in the art, such as emulating instructions in native code pool 32 to identify traces, interrupting native execution of instruction in native code pool 32 to identify traces, or instrumenting instructions in native code pool 32 with branch instructions that branch to code that collects trace information. For the purposes of illustrating the present invention, assume that native code pool 32 includes instructions 10 from FIG. 1.

Trace picker 34 provides identified traces to translator 36. Translator 36 translates the traces into code cache 38 and encodes static branch prediction hints into branch predictions in the translated traces. Translator 36 also stores trampoline blocks into trampoline block cache 44. The trampoline blocks link incorrectly predicted branches in code cache 38 to other traces in code cache 38, or back to trace picker 34.

As translator 36 translates traces into code cache 38, translator 3,6 updates an array called address_map_taddr. This array correlates addresses of instructions in native code pool 32 with an addresses of instructions in traces in the code cache 38. If an instruction in the native code pool 32 has not been translated into code cache 38, then the corresponding entry in address_map_taddr is null.

Assume that trace picker 34 has identified two hot traces in instructions 10 in FIG. 1. The first hot trace comprises blocks 12 block 13, and the second hot trace comprises blocks 12, 14, 17, 21, and 27. Trace picker 34 provides these traces to translator 36, and translator 36 translates the traces into code cache 38 and stores corresponding trampoline blocks into trampoline block cache 44. The result is shown in FIG. 4.

Figure 4:
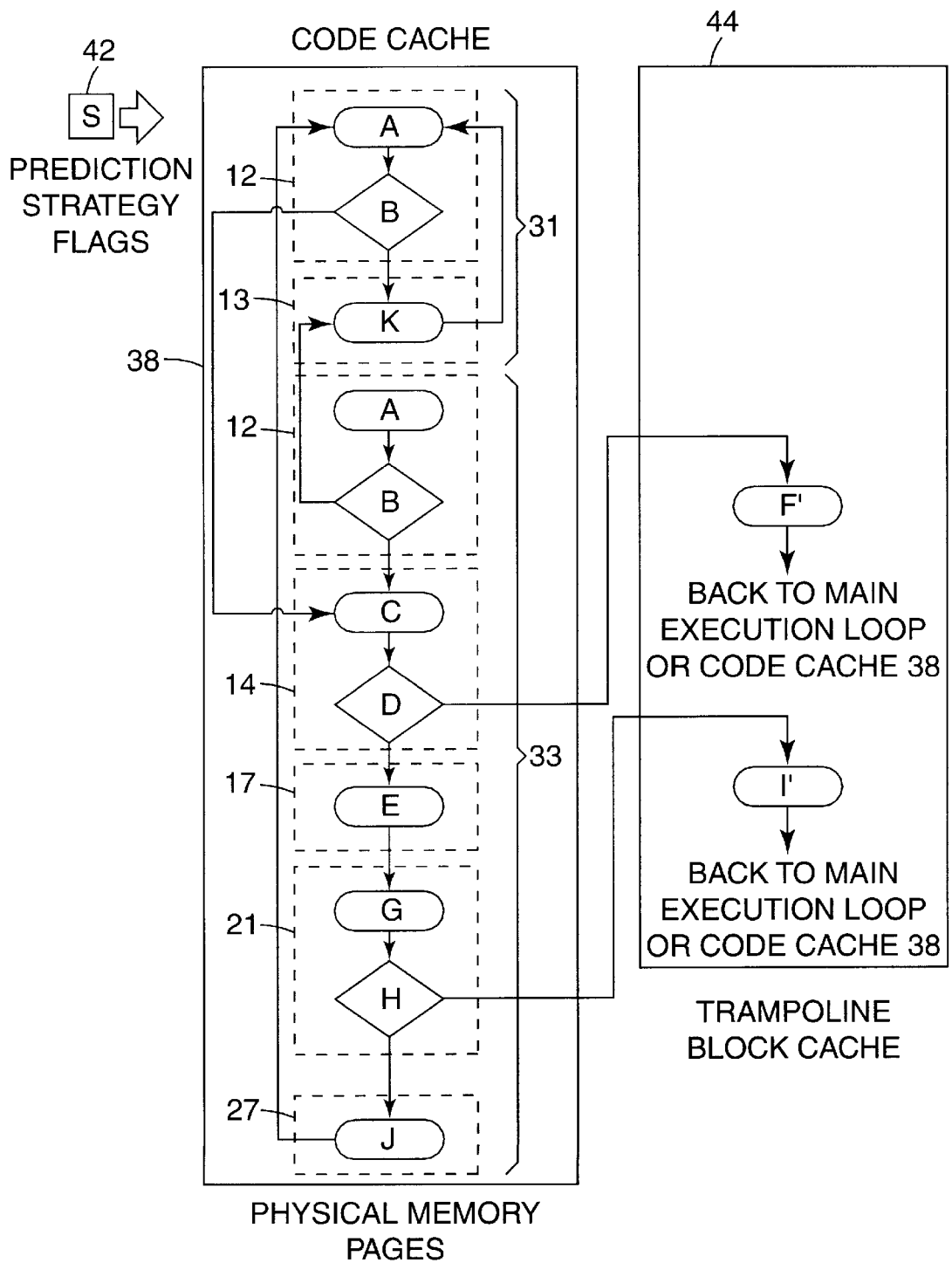
FIG. 4 shows a code cache and a trampoline block cache after some of the basic code blocks shown in FIG. 1 have been translated in accordance with the present invention.

In FIG. 4, basic blocks 12, and 13 have been translated into code cache 38 as trace 31, and block 12, 14, 17, 21, and 27 have been translated into code cache 38 as trace 33. Prediction strategy flags 42 have been set to "static" to cause conditional branch instructions within code cache 38 to be predicted using static hints encoded into the conditional branch instructions. As discussed above with reference to FIG. 2, certain prior art computer systems manufactured by the Hewlett-Packard Company include a branch prediction strategy flag in each translation lookaside buffer (TLB). The branch prediction strategy flag in each TLB determines the branch prediction strategy of branch instructions residing in the physical memory pages associated with the TLB. Accordingly, in such a computer system, all the branch prediction strategy flags in all the TLBs associated with the physical memory pages that comprise code cache 38 are set to "static".

Returning to FIG. 4, in trace 31 basic block 13 is stored in code cache 38 immediately below basic block 12. The conditional branch instruction of segment B of basic block 12 in trace 31 is adjusted to predict a "fallthrough" to segment K of basic block 13, and branch to segment C of basic block 14 of trace 33 in the event of an incorrect prediction. As is known in the art, "fallthroughs" execute more quickly than branches because the flow of execution does not change.

Basic blocks 12, 14, 17, 21, and 27 have been placed sequentially into code cache 38 as trace 33. The basic blocks in trace 33 are arranged such that block 14 is reached via a fallthrough from block 12, block 17 is reached via a fallthrough from 14, block 21 is reached via a fallthrough from block 17, and block 27 is reached via a fallthrough from block 21. The conditional branch instruction of segment B of basic block 12 in trace 33 is adjusted to predict a "fallthrough" to segment C of basic block 14, and branch to segment K of basic block 13 of trace 31 in the event of an incorrect prediction. The unconditional branch statement at the end of segment J of block 27 in trace 33 has been adjusted to branch to the first instruction of segment A of block 12 in trace 33.

In addition, in trace 33 static predictions to fallthrough have been encoded into the conditional branch instructions at the ends of segment D of basic block 14 and segment H of basic block 21. In certain computer systems manufactured by the Hewlett-Packard Company, when static branch prediction is enabled forward unconditional branches are always predicted as not taken and backward unconditional branches are always predicted as taken. Accordingly, the backward branches in trace 33 from block 27 to block 12 and from block 13 to block 12 are always predicted as taken. On advantage of the present invention is that there are no forward unconditional branches in code cache 32. All unconditional forward branches from instructions 10 in FIG. 1 are implemented as fallthroughs in code cache 38.

The conditional branch instruction at the end of segment D in trace 33 is adjusted to branch to trampoline block F', and the conditional branch statement at the end of segment H in trace 33 is adjusted to branch to trampoline block I'. Note that if block 27 ended with a conditional branch statement, that branch statement would be encoded with a prediction to branch back to the first instruction of segment A of block 12 in trace 33, and the trampoline block could be placed under block 27 and reached via a fallthrough.

Trampoline blocks are used to recover from incorrectly predicted branch instructions. Below is a segment of pseudo code that may be used to implement the trampoline blocks.

Trampoline Blocks - Pseudo Code

```
// T_ADDR is the address in native code pool 10 that is the target of the branch out of the trace
// S_ADDR is the address in code cache 10 of the branch instruction that called the trampoline block.
if (address_map_taddr[T_ADDR] is in the code cache) {
    // code cache hit
    jump to address_map_taddr[T_ADDR];
}
else {
    jump to trace_picker [T_ADDR, S_ADDR];
}
```

Consider that the branch instruction at the end of segment H of block 21 of trace 33 is incorrectly predicted, and execution flow must logically continue with segment I of block 23 in FIG. 1. The array address_map_taddr is accessed to determine the address of the first instruction of segment I in native code pool 32. Since block 23 is not in code cache 38, the trampoline block will pass control back to trace picker 34 along with the variables T_ADDR and S_ADDR. Trace picker 34 may determine that this is not a hot path, and may execute block 23 from native code pool 32 using emulation or native execution. Alternatively, trace picker 34 may determine that the path to block 23 is hot, and provide the trace through block 23 to translator 36.

When translator 36 adds traces to code cache 38, it can either link traces by backpatching branch instructions in code cache 38, or it can link traces using trampoline blocks. For example, assume that in FIG. 4, trace 31 was initially placed in code cache 38, but trace 31 was not. At this point, the conditional branch instruction of segment B of block 12 of trace 31 would reach segment C of block 14 via a trampoline block C'. Later, when trace 33 is added, the conditional branch statement of segment B of block 12 of trace 31 is backpatched to branch directly to the first instruction of segment C of basic block 14 of trace 33, as shown in FIG. 4.

Alternatively, incorrectly predicted branch instructions can be processed exclusively by trampoline blocks. In the pseudo code above, a trampoline block may link to a trace in the code cache 38 after accessing the array address_map_taddr. If this method is used, each incorrectly predicted branch instruction would branch to a trampoline block. For example, in FIG. 4, the conditional branch instruction at the end of segment B of block 12 of trace 31 would branch to trampoline block C', and the conditional branch instruction at the end of segment B of block 12 of trace 33 would branch to trampoline block K'. Note that the trampoline blocks can also be provided with instrumentation code monitors branch behavior. For example, if a hot path develops between two traces in code cache 38, the trampoline blocks can invoke trace picker 34 to collect a trace along the new hot path.

In summary, the present invention provides a substantial improvement in program code execution performance during run-time by translating basic blocks lying along hot execution paths into a code cache where the hot execution paths are executed natively using static branch prediction hints encoded into conditional branch instructions. One advantage of the present invention is that the blocks that lie along a hot path need not come from the same program. For example, if two separate programs are communicating via subroutine calls, and a hot path develops that includes basic blocks from each program, the present invention can store the basic blocks from each program in the code cache in a single trace. Accordingly, the present invention identifies and exploits opportunities for optimization that would be possible to identify at compile time.

One example of an especially advantageous use of the present invention is program code that has been instrumented with debugging code. Typically, debugging code comprises a large number of branch instructions interspersed among the program code. When debugging is enabled (typically by setting a debug flag) the branches are taken to additional debugging code. When debugging is disabled, the branches are not taken. The present invention greatly improves the performance of such code when debugging is turned off because the program code quickly gets translated into the code cache along with prediction hints to skip the additional debugging code, and the additional debugging code stays in the native code pool where it is rarely executed.

Although the present invention has been described with reference to certain embodiments, workers skilled in the art will recognize that changes may be made in form and detail without departing from the spirit and scope of the invention.

What is claimed is:

1. A method of optimizing native code instructions at run time comprising:

executing native code instructions contained in a native code pool;

identifying a hot trace of basic blocks of instructions from the native code instructions based on executing native code instructions contained in the native code pool, wherein each basic block of instructions includes a branch instruction;

translating the hot trace;

storing the basic blocks of instructions of the translated hot trace in a trace order in a code cache wherein the translated hot trace includes first and last basic blocks of instructions;

associating static predictions derived from executing native code instructions contained in the native code pool with branch instructions in the translated hot trace stored in the code cache and including:

adjusting a static prediction of the branch instruction of the last basic block of instructions to branch to a first instruction of the first basic block of instructions; and adjusting a static prediction of each branch instruction in each basic block of instructions between the first basic block of instructions, inclusive, to the last basic block of instructions, exclusive, to branch to a first instruction of a next basic block in the trace order; and executing the translated hot trace from the code cache.

2. The method of claim 1 wherein a prediction strategy flag indicating a static prediction strategy is associated with each memory page comprising the code cache.

3. The method of claim 1 and further comprising:

adjusting branch instructions translated into the code cache to branch to trampoline blocks when branch predictions associated with branch instructions are incorrect.

4. The method of claim 3 wherein a trampoline block is implemented by a method comprising:

determining whether a target instruction is in the code cache;

branching to the target instruction if it is in the code cache; and branching to a trace selector if the target instruction is not in the code cache.

5. An apparatus implemented in a computer system that uses static branch prediction hints to improve performance of translated code at run time, the apparatus comprising:

a native code pool that stores program instructions;

a code cache storing translated hot traces of basic blocks of instructions and from which translated hot traces of basic blocks of instructions are executed;

a trace picker that identifies hot traces of basic blocks of instructions from the native code pool based on execution of instructions in the native code pool, wherein each basic block of instructions includes a branch instruction; and a translator that receives selected hot traces of basic blocks of instructions from the trace picker and translates the selected hot traces of basic blocks of instructions and places the basic blocks of instructions of the translated hot traces in the code cache in a trace order, wherein each translated hot trace includes first and last basic blocks of instructions, wherein the translator associates static branch predictions with branch instructions in the translated hot trace stored in the code cache and for each hot trace being stored in the code cache, the translator adjusts a static prediction of the branch instruction of the last basic block of instructions of the hot trace to branch to a first instruction of the first basic block of instructions of the hot trace, and adjusts a static prediction of each branch instruction in each basic block of instructions between the first basic block of instructions, inclusive, to the last basic block of instructions, exclusive, to branch to a first instruction of a next basic block in the trace order.

6. The apparatus of claim 5 wherein the translator initiates execution of translated hot traces of basic blocks of instructions.

7. The apparatus of claim 5 wherein a prediction strategy flag indicating a static prediction strategy is associated with each memory page comprising the code cache.

8. The apparatus of claim 5 and further comprising:

a trampoline block cache.

9. The apparatus of claim 8 wherein the translator adjusts branch instructions translated into the code cache to branch to trampoline blocks in the trampoline block cache when branch predictions associated with branch instructions are incorrect.

10. The apparatus of claim 9 wherein a trampoline block determines whether a target instruction is in the code cache, branches to the target instruction if it is in the code cache, and branches to the trace selector if the target instruction is not in the code cache.

11. A program storage medium having computer readable program code thereon for causing native code to be optimized at run time, the program storage medium comprising:

a first code segment of computer readable program code for executing native code instructions contained in a native code pool;

a second code segment of computer readable program code for identifying a hot trace of basic blocks of instructions from the native code instructions based on executing native code instructions contained in the native code pool, wherein each basic block of instructions includes a branch instruction;

a third code segment of computer readable program code for translating the hot trace and storing the basic blocks of instructions of the translated hot trace in a code cache in a trace order, wherein the translated hot trace includes first and last basic blocks of instructions;

a fourth code segment of computer readable program code for associating static predictions derived from executing native code instruction contained in the native code pool with branch instructions in the translated hot trace stored in the code cache, and adjusting a static prediction of the branch instruction of the last basic block of instructions to branch to a first instruction of the first basic block of instructions, and adjusting a static prediction of each branch instruction in each basic block of instructions between the first basic block of instructions, inclusive, to the last basic block of instructions, exclusive, to branch to a first instruction of a next basic block in the trace order; and a fifth code segment of computer readable program code for executing the translated hot trace from the code cache.

12. The program storage medium of claim 11 and further comprising:

a sixth code segment of computer readable program code for adjusting branch instructions translated into the code cache to branch to trampoline blocks when branch predictions associated with branch instructions are incorrect.

13. The program storage medium of claim 12 wherein a trampoline block is implemented by:

a seventh code segment of computer readable program code for determining whether a target instruction is in the code cache;

a eight code segment of computer readable program code for branching to the target instruction if it is in the code cache; and a ninth code segment of computer readable program code for branching to a trace selector if the target instruction is not in the code cache.

* * * * *